United States Patent

Drinkard et al.

[15] 3,653,184

[45] Apr. 4, 1972

[54] SEPARATION OF C$_8$ AROMATICS MIXTURE WITH PRODUCTION CHROMATOGRAPHY

[72] Inventors: B. M. Drinkard; Paul T. Allen; Edward H. Unger, all of Beaumont, Tex.

[73] Assignee: Mobil Oil Corporation

[22] Filed: June 8, 1970

[21] Appl. No.: 44,459

[52] U.S. Cl. ................................................. 55/67, 55/75
[51] Int. Cl. .................................................. B01d 15/08
[58] Field of Search ................. 55/67, 197, 386, 75, 389; 73/23.1; 210/198, 3

[56] References Cited

UNITED STATES PATENTS 3,285,701  11/1966  Robertson ....................... 55/197 X

*Primary Examiner*—Jim L. DeCesare
*Attorney*—Oswald G. Hayes and Andrew L. Gaboriault

[57] ABSTRACT

A mixture of C$_8$ aromatics, ethylbenzene, ortho-xylene, meta-xylene and para-xylene is separated into its component parts by production gas chromatography. The mixture is passed with a carrier in contact with a strongly polar liquid partitioning liquid to separate the ortho-xylene and ethylbenzene by different sorption rates and the remaining mixture of meta- and para-xylene is passed in contact with a certain zeolite to separate the para-xylene and meta-xylene by different sorption rates.

12 Claims, 1 Drawing Figure

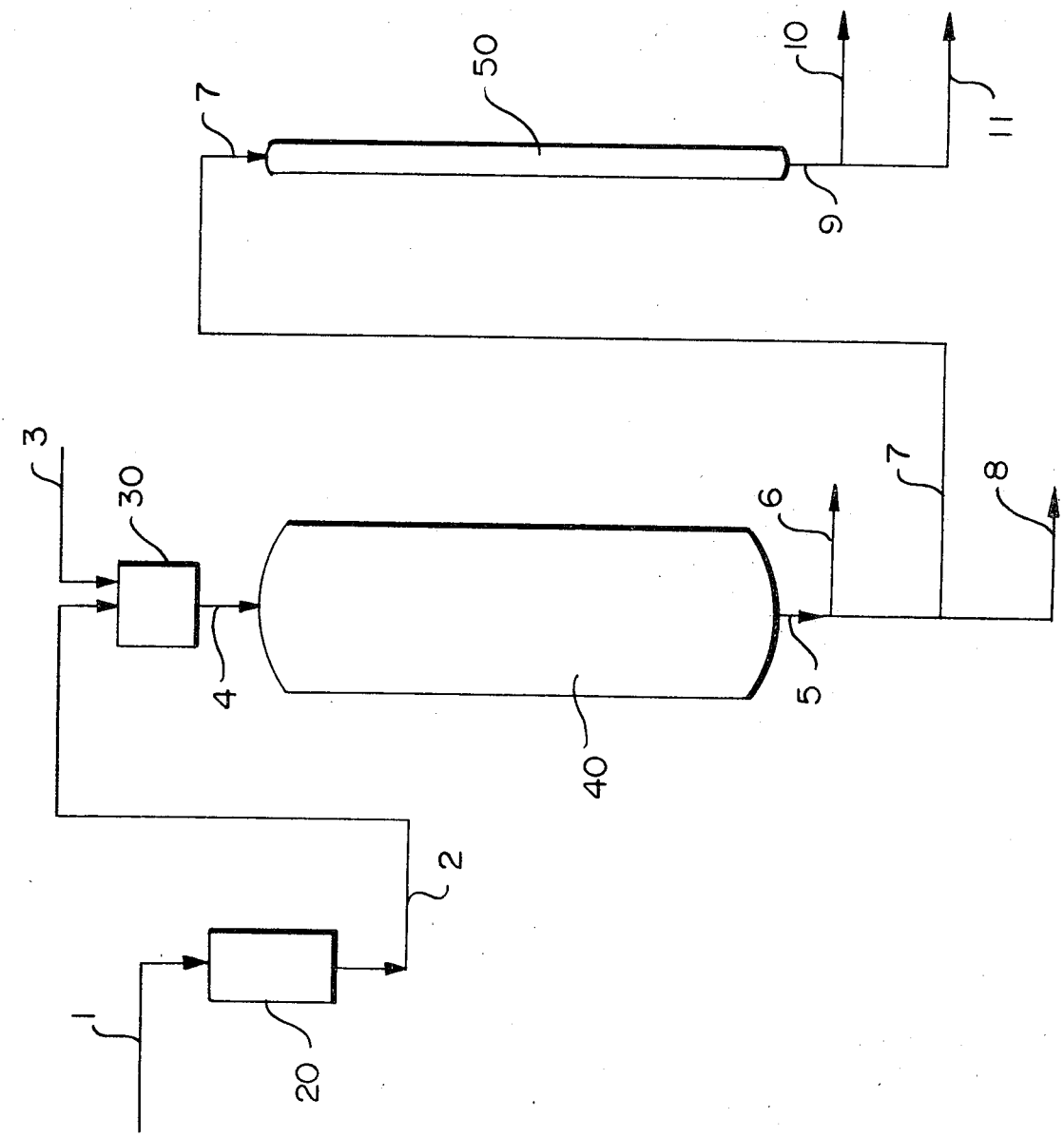

SEPARATION OF C AROMATICS MIXTURE WITH PRODUCTION CHROMATOGRAPHY

BACKGROUND OF THE INVENTION

1. Field of the Invention

This invention relates to the gas chromatographic separation of $C_8$ aromatic mixtures and more particularly to a chromatographic method for the separation of a mixture of ethylbenzene, ortho-xylene, meta-xylene and para-xylene into its component parts.

2. Description of the Prior Art

Gas chromatography, as a method for the separation of mixtures of difficultly separable materials, has been well known for some time. In general, the method operates on the principle of distribution of the components of a sample over separate phases and subsequent separation of these phases. For example, in gas-liquid chromatography, the volatile components of a sample are distributed between an inert gas phase (carrier gas) and a stationary liquid. Similarly, in absorption chromatography, there is obtained sample distribution over a solid adsorbent and a moving liquid phase. Columns packed with the stationary liquid or solid absorbent are usually employed to effect the separations by passage of the mixture to be separated and carrier therethrough. Hence, chromatography is a physical method of separation in which the components to be separated are distributed between two phases, one of the phases constituting a stationary bed of large surface area, the other being a fluid that percolates through or along the stationary bed.

While chromatography has been applied to the separation of many difficultly separable mixtures with great success, the separation of close-boiling isomeric mixtures has not been particularly successful. One such mixture is $C_8$ aromatics and especially a mixture of ethylbenzene, ortho-xylene, meta-xylene and para-xylene, particularly on a production scale and in a very high state of purity. Para-xylene, in particular, is required in a very high state of purity for the manufacture of terephthalic acid which is an intermediate in the manufacture of synthetic fibers such as "Dacron." Normally it is separated from a product stream containing ethylbenzene, m-xylene and o-xylene by costly superfractionation and multistage refrigeration steps. This process involves high operating costs and has a limited yield.

It has also long been known that porous substances such as silica gel, activated char, and certain zeolites, have certain selective absorption characteristics useful in resolving a hydrocarbon mixture into its component parts. Thus, silica gel is selective in removing aromatic hydrocarbons from non-aromatic hydrocarbons and activated chars are useful in separating olefins from mixtures with paraffins. Similarly, the molecular sieve properties of zeolites have been utilized to selectively remove one molecular species from a mixture of the same with other species.

Although a wide variety of zeolite materials, particularly crystalline aluminosilicates, have been successfully employed in various separation schemes, nevertheless, these prior art processes, in general, fell into one or two main categories. In one type, a zeolite is employed having a pore size sufficiently large to admit the vast majority of components normally found in a process stream. These molecular sieves are referred to as large pore zeolites and they are generally stated to have a pore size of about 13A. such as zeolite X, Y, and L. The other type of crystalline aluminosilicates are those having a pore size of approximately 5A. which are utilized to separate small molecules such as n-paraffins to the substantial exclusion of other molecular species. The zeolites of these types however have not been found capable of effectively separating the close-boiling $C_8$ aromatics.

Another proposed solution to this problem is set forth in U.S. Pat. No. 3,126,425. This patent discloses contacting a mixture of xylene isomers with crystalline aluminosilicates such that the ortho and meta isomers are sorbed by said aluminosilicates and the para isomer is concentrated in the unabsorbed portion. This method is concerned with the concentration of the more symmetrical disubstituted aromatic isomer, such as p-xylene, in the unadsorbed stream. It therefore apparently represents an extension of the normal relative partitioning of xylene isomers with high surface area solids to the more selective crystalline aluminosilicate surface. All of the isomers described in the above patent will be sorbed by crystalline aluminosilicates having uniform pore openings of 10-13 Angstrom units. The separations shown are therefore not dependent on the molecular sieving properties of the 13 Angstrom zeolite, but rather, on the relative partitioning of the said isomers between the intracrystalline sorbed phase and the free liquid phase. This method is therefore severely limited and may as stated be restricted because of economic considerations to processing only streams containing 50 percent or more para-xylene. The normal concentration of p-xylene in equilibrium mixtures of xylene isomers obtained from commercial isomerization units is generally about 24 weight percent so that this method will not accomplish the desired separation on feeds such as this.

In still a later development by Applicant's assignee, it was discovered that selective separations of this type can be achieved by utilizing a unique class of crystalline alumino-silicates which possess unique molecular sieving properties in that they allow entry and egress to their internal pore structure of not only normal paraffins but also of slightly branched paraffins and yet have the ability to effectively exclude paraffins possessing quarternary carbon atoms at short contact times. These zeolites also possess the ability to selectively sorb simple, lightly-substituted monocyclic hydrocarbons from mixed hydrocarbon streams containing highly-substituted monocyclic, polycyclic, heterocyclic or even simple polycyclic hydrocarbons. These zeolites also possess the unique property of selectively sorbing 1,4-disubstituted aromatic compounds in admixture with 1,2-, 1,3-, or more highly substituted aromatic hydrocarbons. Para-xylene, for example, can be selectively separated from ortho- and meta-xylene by contacting said mixture with this unique class of zeolites. This discovery is fully disclosed and claimed in copending J. Cattanach U.S. application Ser. No. 882,692 filed Dec. 5, 1969, of Applicant's assignee.

The process of the present invention represents an improvement on the process disclosed in copending U.S. application Ser. No. 882,692, in the separation of a mixture of ethylbenzene, ortho-xylene, meta-xylene and para-xylene into its component parts by utilization of the special molecular sieves in combination with a first liquid partitioning strongly polar phase chromatography separation.

SUMMARY OF THE INVENTION

It is accordingly one object of the invention to provide a process which overcomes or otherwise mitigates these prior art disadvantages.

A further object of the invention is to provide a chromatographic separation process for separation of certain $C_8$ aromatics.

A still further object is to provide a two-step gas chromatographic process for the substantially quantitative separation of a mixture containing ethylbenzene, ortho-xylene, meta-xylene and para-xylene into its component parts.

Other objects and advantages of the present invention will become apparent as the description thereof proceeds.

In satisfaction of the foregoing objects and advantages, there is provided by this invention a process for the separation of a mixture containing ethylbenzene, ortho-xylene, meta-xylene and para-xylene into its component parts comprising contacting said mixture with a strongly polar phase partitioning agent for a period of time to separate the ethylbenzene and ortho-xylene, and passing the remaining mixture of para-xylene and meta-xylene in contact with the carrier and a certain zeolite to separate the para-xylene and meta-xylene, and recovering the separated components.

Brief Description of the Drawing

Reference is now made to the drawing accompanying this application wherein there is set forth a suitable diagram of an apparatus for conducting the process of the invention.

DESCRIPTION OF PREFERRED EMBODIMENTS

The process of the present invention has been found to provide a chromatographic process for $C_8$ aromatics separation that eliminates para-xylene crystallizers, ethylbenzene and ortho-xylene fractionating columns and still produces quantitative recovery of high purity components. The process is especially applicable for separation of these components on a production scale.

As indicated, the process utilizes a two-step chromatographic separation of the mixture of ethylbenzene, ortho-xylene, meta-xylene and para-xylene into its component parts. In this process, the mixture, which generally is a feed reformate from a commercial unit, either as a gas, liquid or mixed phase, is preferably contacted with a suitable fluid carrier, typical carriers including steam, water, nitrogen, air, helium, hydrogen, hydrocarbons, alcohols, ketones, etc. and then contacted with a strongly polar liquid phase partitioning agent in the first step. Conveniently, contact with this agent and also the zeolite in the second step, is carried out in columns, that is, the partitioning agent and zeolite are maintained in separate columns and the feed/carrier mixture is passed therethrough. In general the column containing the liquid partitioning agent is about thirty times larger in diameter than the zeolite column although this may be varied depending on other conditions of the process.

The composition of a typical feed mixture for the process in parts by weight is preferably as follows:

| Component | Amount wt. % |
| --- | --- |
| Ethylbenzene | 1–15 (LTI) |
| Para-xylene | 20–30 |
| Meta-xylene | 40–50 |
| Ortho-xylene | 15–25 |

In the first step of the process, the feed mixture is contacted with a suitable carrier, as described above, and passed into the strongly polar liquid partitioning phase-containing column. In this column, the ortho-xylene and ethylbenzene are separated from the mixture of para- and meta-xylene and eluted from the column. This occurs by reason of the different rates of sorption of the components. In this process, the ethylbenzene is emitted first for recovery followed by the mixture of para- and meta-xylenes from the column. The latter is then passed to the second stage. Thereafter, ortho-xylene, of >99 percent purity is emitted, the ethylbenzene (99 percent pure) and ortho-xylene thus being recovered in high purity and quantitative yields. Hence the rate of progress of ethylbenzene through the column is faster than the ortho-xylene.

The remaining mixture of para- and meta-xylenes is then transmitted through the second column containing the zeolite substance together with the carrier. In this column the two components of the mixture are separated to provide initially the meta-xylene in >99 percent purity and thereafter the para-xylene in >99 percent purity, both in substantially quantitative yields. In this column, the meta-xylene is sorbed at a slower rate than the para-xylene.

The process may be better understood by reference to the drawing accompanying the application wherein numeral 1 denotes a reformate feed of the above composition being introduced into feed tank 20, thence by line 2 to vessel 30 where it is admixed with the carrier from line 3. Conveniently the carrier is helium or steam, although others may be used, as described above, and vessel 30 is a vaporizer.

The mixture than passes via line 4 into polar phase, liquid-partitioning column 40 for the initial separation. As indicated above, this column is generally about thirty times larger in diameter than the second column. In column 40, after about 5–6 minutes, ethylbenzene is emitted via line 5 and is taken off by line 6. Therefore, in the period of about 6–7 minutes, the mixture of meta-xylene and para-xylene is eluted via line 5 and passed through line 7 to the second or zeolite stage for further separation. Finally, in the period of about 8–9 minutes, ortho-xylene is emitted via line 5 and is taken off by line 8. The time periods are based on the time of entry into the column and are dependent on the conditions of the chromatographic process, i.e., temperature, carrier flow, length of column, etc.

In the meantime, the mixture of meta- and para-xylenes in line 7 is sent for passage through column 50 which contains the zeolite. From column 50, it will be observed that after a period of about 2 minutes, meta-xylene is emitted via line 9 and is taken off by line 10. Thereafter, in the period of about 5 minutes, the para-xylene is emitted via line 9 and is taken off by line 11. The time periods mentioned for removal of each material are cumulative based on the time at which the mixture is introduced into zeolite column 50.

In the first column, there is maintained a gas-liquid chromatographic medium, in particular a strongly polar phase liquid partitioning agent, ordinarily employed for separation of components as they pass through a column with a carrier. A preferred material of this type is known commercially as Zonyl E-7 (Dupont-condensation product of pyromellitic anhydride with a mixture of $C_5$-$C_7$ trihydrofluoroalcohols) on Chromosorb P. However, equivalent materials may be employed with equivalent results, Such materials are for example diethylene gylcol succinate, polyethylene gylcol, tetra cyanoethylated pentaery-thritol, 1,2,3, tris (2-cyanoethoxy) propane and the like. All of these materials are well known in the chromatography art. Obviously equivalent materials may also be used. In general, however, the first column may be said to contain any chromatographic stationary liquid partitioning agent useful in separating ethylbenzene and ortho-xylene from meta- and para-xylene in the chromatographic art.

As indicated above, the zeolite utilized in the second column are of a special type and are disclosed and claimed for use in a novel zeolite chromatographic process in copending U.S. application Ser. No. 882,692, filed Dec. 5, 1969, of J. Cattanach of the same assignee. Generally these zeolitic materials allow selective separations to be achieved depending on either the size, shape or polarity of the sorbate molecules. This class of novel crystalline aluminosilicates can generally be stated to have intermediate shape-selective sorption properties. The unique nature of this novel class of zeolites is characterized by the presence of uniform pore openings which are apparently elliptical rather than circular in nature. The effective pore openings of this unique class of zeolites have both a major and minor axis, and it is for this reason that the unusual and novel molecular sieving effects are achieved. The unique type of molecular sieving produced has generally been referred to as a "keyhole" molecular sieving action. From their dynamic molecular sieving properties it would appear that the major and minor axis of the elliptical pore in this family of zeolites have effective sizes of about $7.0 \pm 0.7$A. and $5.0 \pm 0.5$A., respectively.

The family of ZSM-5 type compositions, useful in the novel process of this invention, has the characteristic X-ray diffraction pattern set forth in Table 1, hereinbelow. ZSM-5 compositions can also be identified, in terms of mole ratios of oxides, as follows:

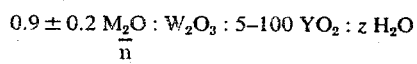

wherein M is a cation, $n$ is the valence of said cation, W is selected from the group consisting of aluminum and gallium, Y is selected from the group consisting of silicon and germanium, and Z is from 0 to 40. In a preferred synthesized form, the zeolite has a formula, in terms of mole ratios of oxides, as follows:

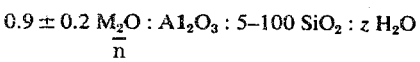

and M is selected from the group consisting of a mixture of alkali metal cations, especially sodium, and tetraalkylammonium cations, the alkyl groups of which preferably contain 2–5 carbon atoms.

In a preferred embodiment of ZSM-5, W is aluminum, Y is silicon and the silica/alumina mole ratio is at least 10 and ranges up to about 60.

Members of the family of ZSM-5 zeolites possess a definite distinguishing crystalline structure whose X-ray diffraction pattern shows the following significant lines:

TABLE I

| Interplanar Spacing d (A) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |
| 2.94 ± 0.02 | W |

These values, as well as all other X-ray data, were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 I/I, where I is the intensity of the strongest line or peak, and d (obs.), the interplanar spacing in A, corresponding to the recorded lines, were calculated. In Table I the relative intensities are given in terms of the symbols S = strong, M = medium, MS = medium strong, MW = medium weak and VS = very strong. It should be understood that this X-ray diffraction pattern is characteristic of all the species of ZSM-5 compositions. Ion exchange of the sodium ion with other cations reveals substantially the same pattern with some minor shifts in interplanar spacing and variation in relative intensity. Other minor variations can occur depending on the silicon to aluminum ratio of the particular sample, as well as if it had been subjected to thermal treatment. Various cation exchanged forms of ZSM-5 have been prepared. X-ray powder diffraction patterns of several of these forms are set forth below. The ZSM-5 forms set forth below are all aluminosilicates.

TABLE 2

X-ray diffraction ZSM-5 powder in cation exchanged forms d spacings observed

| As made | HCl | NaCl | CaCl₂ | RECl₃ | AgNO₃ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
|  |  | 9.01 | 9.02 |  | 8.99 |
| 8.06 |  |  |  |  |  |
| 7.44 | 7.46 | 7.46 | 7.46 | 7.40 | 4.46 |
| 7.08 | 7.07 | 7.09 | 7.11 |  | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 |  | 5.38 | 5.37 | 5.38 | 5.37 |
| 5.13 | 5.11 | 5.14 | 5.12 | 5.14 |  |
| 4.99 | 5.01 | 5.01 | 5.01 | 5.01 | 5.01 |
|  |  | 4.74 |  |  |  |
| 4.61 | 4.62 | 4.62 | 4.61 | 4.63 | 4.62 |
|  |  | 4.46 | 4.46 |  | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 |  | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |

TABLE 2 Continued

X-ray diffraction ZSM-5 powder in cation exchanged forms d spacings observed

| As made | HCl | NaCl | CaCl₂ | RECl₃ | AgNO₃ |
|---|---|---|---|---|---|
| 3.64 | 3.65 | 3.65 | 3.65 | 3.65 | 3.65 |
|  | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 2.26 | 3.25 | 3.25 | 3.26 |
| 3.17 |  |  | 3.17 | 3.18 |  |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
|  |  |  |  | 2.97 |  |
|  | 2.95 | 2.95 | 2.94 | 2.95 | 2.95 |
| 2.86 | 2.87 | 2.87 | 2.87 | 2.87 | 2.87 |
| 2.80 |  |  |  |  |  |
| 2.78 |  |  | 2.78 |  | 2.78 |
| 2.73 | 2.74 | 2.74 | 2.73 | 2.74 | 2.74 |
| 2.67 |  |  | 2.68 |  |  |
| 2.66 |  |  | 2.65 |  |  |
| 2.60 | 2.61 | 2.61 | 2.61 | 2.61 | 2.61 |
|  | 2.59 |  | 2.59 |  |  |
| 2.57 |  | 2.57 | 2.56 |  | 2.57 |
| 2.50 | 2.52 | 2.52 | 2.52 | 2.52 |  |
| 2.49 | 2.49 | 2.49 | 2.49 | 2.49 | 2.49 |
|  |  |  | 2.45 |  |  |
| 2.41 | 2.42 | 2.42 | 2.42 | 2.42 |  |
| 2.39 | 2.40 | 2.40 | 2.39 | 2.40 | 2.40 |
|  |  |  | 2.38 | 2.35 | 2.38 |
|  | 2.33 |  | 2.33 | 2.32 | 2.33 |
|  | 2.30 |  |  |  |  |
|  | 2.24 | 2.23 | 2.23 |  |  |
|  | 2.20 | 2.21 | 2.20 | 2.20 |  |
|  | 2.18 | 2.18 |  |  |  |
|  |  | 2.17 | 2.17 |  |  |
|  | 2.13 |  | 2.13 |  |  |
|  | 2.11 | 2.11 |  | 2.11 |  |
|  |  |  | 2.10 | 2.10 |  |
|  | 2.08 | 2.08 |  | 2.08 | 2.08 |
|  |  | 2.07 | 2.07 |  |  |
|  |  |  | 2.04 |  |  |
| 2.01 | 2.01 | 2.01 | 2.01 | 2.01 | 2.01 |
| 1.99 | 2.00 | 1.99 | 1.99 | 1.99 | 1.99 |
|  |  |  | 1.97 | 1.96 |  |
| 1.95 | 1.95 | 1.95 | 1.95 | 1.95 |  |
|  |  |  |  | 1.94 |  |
|  | 1.92 | 1.92 | 1.92 | 1.92 | 1.92 |
| 1.91 |  |  |  | 1.91 |  |
|  |  |  |  | 1.88 |  |
| 1.87 | 1.87 | 1.87 | 1.87 | 1.87 | 1.87 |
|  | 1.86 |  |  |  |  |
| 1.84 | 1.84 |  |  | 1.84 | 1.84 |
| 1.83 | 1.83 | 1.83 | 1.83 | 1.83 |  |
| 1.82 |  | 1.81 |  | 1.82 |  |
| 1.77 | 1.77 | 1.79 | 1.78 |  | 1.77 |
| 1.76 | 1.76 | 1.76 | 1.76 | 1.76 | 1.76 |
|  |  | 1.75 |  |  | 1.75 |
|  | 1.74 | 1.74 | 1.73 |  |  |
| 1.71 | 1.72 | 1.72 | 1.71 |  | 1.70 |
| 1.67 | 1.67 | 1.67 |  | 1.67 | 1.67 |
| 1.66 | 1.66 |  | 1.66 | 1.66 | 1.66 |
|  |  | 1.65 | 1.65 |  |  |
|  |  | 1.64 | 1.64 |  |  |
|  | 1.63 | 1.63 | 1.63 | 1.63 | 1.62 |
|  | 1.61 | 1.61 | 1.61 |  | 1.61 |
| 1.58 |  |  |  |  |  |
|  | 1.57 | 1.57 |  | 1.57 | 1.57 |
|  |  | 1.56 | 1.56 | 1.56 |  |

Zeolite ZSM-5 can be suitably prepared by preparing a solution containing tetrapropyl ammonium hydroxide, sodium oxide, an oxide of aluminum or gallium, an oxide of silica or germanium, and water and having a composition, in terms of mole ratios of oxides, falling within the following ranges:

TABLE 3

|  | Broad | Preferred | Particularly Preferred |
|---|---|---|---|
| OH⁻/SiO₂ | 0.07–1.0 | 0.1–0.8 | 0.2–0.75 |
| R₄N⁺/(R₄N⁺+Na⁺) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum or gallium and Y is silicon or germanium, maintaining the mixture until crystals of the zeolite are formed. Thereafter, the crystals are separated from the liquid and recovered. Typical reaction conditions consist of heating the foregoing reaction mixture to a temperature of from about 90° to 200° C. for a period of time of from about 6 hours to 60 days. A more preferred temperature range is from about 100° to 175° C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230° F., for from about 8 to 24 hours. Of course, milder conditions may be employed if desired, e.g., room temperature under vacuum.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-5 is disclosed and claimed in Ser. No. 865,472, filed Oct. 10, 1969.

Another operable zeolite falling within the above class is zeolite ZSM-8 which is described and claimed in Ser. No. 865,418, filed Oct. 10, 1969.

ZSM-8 can also be identified, in terms of mole ratios of oxides, as follows:

$$0.9 \pm 0.2 \frac{M_2O}{n} : Al_2O_3 : 5\text{-}100\ SiO_2 : z\ H_2O$$

wherein M is at least one cation, n is the valence thereof and z is from 0 to 40. In a preferred synthesized form, the zeolite has a formula, in terms of mole ratios of oxides, as follows:

$$0.9 \pm 0.2 \frac{M_2O}{n} : Al_2O_3 : 10\text{-}60\ SiO_2\ z\ H_2O$$

and M is selected from the group consisting of a mixture of alkali metal cations, especially sodium, and tetraethylammonium cations.

ZSM-8 possesses a definite distinguishing crystalline structure having the following X-ray diffraction pattern

TABLE 4

| dA° | I/I₀ | I/I₀ | dA° |
|---|---|---|---|
| 11.1 | 46 | 4 | 2.97 |
| 10.0 | 42 | 3 | 2.94 |
| 9.7 | 10 | 2 | 2.86 |
| 9.0 | 6 | 1 | 2.78 |
| 7.42 | 10 | 4 | 2.73 |
| 7.06 | 7 | 1 | 2.68 |
| 6.69 | 5 | 3 | 2.61 |
| 6.35 | 12 | 1 | 2.57 |
| 6.04 | 6 | 1 | 2.55 |
| 5.97 | 12 | 1 | 2.51 |
| 5.69 | 9 | 6 | 2.49 |
| 5.56 | 13 | 1 | 2.45 |
| 5.36 | 3 | 2 | 2.47 |
| 5.12 | 4 | 3 | 2.39 |
| 5.01 | 7 | 1 | 2.35 |
| 4.60 | 7 | 1 | 2.32 |
| 4.45 | 3 | 1 | 2.28 |
| 4.35 | 7 | 1 | 2.23 |
| 4.25 | 18 | 1 | 2.20 |
| 4.07 | 20 | 1 | 2.17 |
| 4.00 | 10 | 1 | 2.12 |
| 3.85 | 100 | 1 | 2.11 |
| 3.82 | 57 | 1 | 2.08 |
| 3.75 | 25 | 1 | 2.06 |
| 3.71 | 30 | 6 | 2.01 |
| 3.64 | 26 | 6 | 1.99 |
| 3.59 | 2 | 2 | 1.95 |
| 3.47 | 6 | 2 | 1.91 |
| 3.43 | 9 | 3 | 1.87 |
| 3.39 | 5 | 1 | 1.84 |
| 3.34 | 18 | 2 | 1.82 |
| 3.31 | 8 | | |
| 3.24 | 4 | | |
| 3.13 | 3 | | |
| 3.04 | 10 | | |
| 2.99 | 6 | | |

Zeolite ZSM-8 can be suitably prepared by reacting a solution containing either tetraethylammonium hydroxide or tetraethylammonium bromide together with sodium oxide, aluminum oxide, and an oxide of silica and water.

The relative operable proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range $SiO_2/Al_2O_3$ - from about 10 to about 200

$Na_2O$/tetraethylammonium hydroxide - from about 0.05 to 0.20

Tetraethylammonium hydroxide/$SiO_2$ - from about 0.08 to 1.0

$H_2O$/tetraethylammonium hydroxide - from about 80 to about 200

Thereafter, the crystals are separated from the liquid and recovered. Typical reaction conditions consist of heating the foregoing reaction mixture to a temperature of from about 100° to 175° C. for a period of time of from about 6 hours to 60 days. A more preferred temperature range is from about 150° to 175° C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230° F., for from about 8 to 24 hours. Of course, milder conditions may be employed if desired, e.g., room temperature under vacuum.

ZSM-8 is prepared utilizing materials which supply the appropriate oxide. Such compositions include sodium aluminate, alumina, sodium silicate, silica hydrosol, silica gel, silicic acid, sodium hydroxide and tetraethylammonium hydroxide. It will be understood that each oxide component utilized in the reaction mixture can be supplied by one or more initial reactants and they can be mixed together in any order. For example, sodium oxide can be supplied by an aqueous solution of sodium hydroxide, or by an aqueous solution of sodium silicate, tetraethylammonium cation can be supplied by the bromide salt. The reaction mixture can be prepared either batchwise or continuously.

The zeolites used in the instant invention can have the original cations associated therewith replaced by a wide variety of other cations according to techniques well known in the art. Typical replacing cations would include hydrogen, ammonium and metal cations including mixtures of the same.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolites are then preferably washed with water and dried at a temperature ranging from 150° to about 600° F. and thereafter calcined in air or other inert gas at temperatures ranging from about 500° to 1,500 ° F. for periods of time ranging from 1 to 48 hours or more.

Prior to use, the zeolites should be dehydrated at least partially. This can be done by heating to a temperature in the range of 200° to 600° C. in an atmosphere, such as air, nitrogen, etc. and at atmospheric or subatmospheric pressures for between 1 and 48 hours. Dehydration can also be performed at lower temperatures merely by using a vacuum, but a longer time is required to obtain a sufficient amount of dehydration.

In a variation on the second column it may be desired to incorporate the ZSM-5 type zeolite with another material resistant to the temperatures and other conditions employed in the separation processes. Such matrix materials include synthetic or naturally occurring substances as well as inorganic materials such as clays, silica and/or metal oxides. The latter may be either naturally occurring or in the form of gelatinous precipitates or gels including mixtures of silica and metal oxides.

Naturally occurring clays which can be composited with the ZSM-5 type zeolite include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the ZSM-5 type zeolite can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-5 and inorganic oxide gel matrix vary widely with the crystalline aluminosilicate content ranging from about 1 to about 99 percent by weight and more usually, particularly when the composite is prepared in the form of beads in the range of about 40 to about 90 percent by weight of the composite.

Another embodiment of this invention resides in subjecting the zeolite ZSM-5 type to a mild steam treatment carried out at elevated temperatures of 800° to 1,500° F. and preferably at temperatures of about 1,000° to 1,400° F. The treatment may be accomplished in an atmosphere of 100 percent steam or in atmosphere consisting of steam and a gas which is substantially inert to the aluminosilicate. The steam treatment apparently provides beneficial properties in the aluminosilicate compositions and can be conducted before, after or in place of the calcination treatment.

A similar treatment may be accomplished at lower temperatures and elevated pressures, e.g., 350°–700° F. at 10 to about 200 atmospheres.

The temperature at which the separations are carried out is important, It can be stated that the novel process of this invention can be carried out at temperatures ranging from about 100° to about 250° C. It should be noted that a wider temperature range can be employed but because of possibility of catalytic conversion in the zeolite-containing column, 250° C. appears to be a suitable upper limit. A more preferred temperature range appears to be between about 100° to 200° C. It is noted that the above temperatures might vary slightly depending upon the particular cationic form of the crystalline aluminosilicate zeolite employed but, in general, they represent operable parameters for carrying out the novel process of this invention.

The carriers which may be employed are discussed hereinabove. Also the process may be carried out in either a batch or continuous operation. The sorbed materials can be subsequently recovered by conventional desorbing techniques such as thermal stripping, stripping with an inert gas, e.g., nitrogen, helium, etc, or evacuation or elutriation with a suitable polar or non-polar stripping agent, e.g., water, n-hexane, etc.

The following examples will illustrate the best mode contemplated for carrying out the present invention.

EXAMPLE 1–4

Typical preparations of ZSM-5 type zeolites are shown in these examples. Examples 1–3 show the preparation of the hydrogen form ZSM-5 and they involve the use of tetrapropylammonium hydroxide (TPAOH) or bromide (TPABr). Example 4 shows a typical preparation of the hydrogen form ZSM-8 using tetraethyl ammonium hydroxide (TEAOH). Reaction conditions and results are shown in Table 6.

TABLE 6

| | 1 | 2 | 3 | 4 |
|---|---|---|---|---|
| Reaction composition | 30 g. NaAlO$_2$<br>720 g. Ludox<br>1,025 g. of 2.2 N TPAOH | 281 g. Sorbead fixes<br>3.3 lb. TPABr solution | 0.56 lb. NaAlO$_2$<br>44.7 lb. Q-brand<br>5.6 lb. TPABr<br>16.7 lb. NaCl<br>4.5 lb. H$_2$SO$_4$<br>132.0 lb. H$_2$O | 13 g. NaAlO$_2$<br>300 g. 40% TEAOH<br>300 g. H$_2$O<br>1000 g. Ludox |
| Reaction temperature (° C.) | 150 | 160 | 100 | 193 |
| Time (hours) | 168 | 168 | 327 | 144 |

Washed dried at 230° F., calcined 16 hrs. at 1,000° F.

NH$_4$Cl solution

| Base exchange: | | | | |
|---|---|---|---|---|
| Conc. (wt %) | 25 | 5 | 25 | 25 |
| Temp. (° C) | 90 | 25 | 90 | 90 |
| Contacts | X3 | X4 | X3 | X3 |
| Pelleted: | | | | |
| Calcined: | | | | |
| Hours | 16 | 10 | 16 | 16 |
| ° F | 1,000 | 1,000 | 1,000 | 1,000 |
| Steamed: | | | | |
| Hours | 14 | 24 | 14 | 14 |
| ° F | 1,290 | 1,200 | 1,290 | 1,290 |
| P.s.i.a | 15 | 30 | 15 | 15 |
| Chemical composition (g./100 g.): | | | | |
| Na | 0.08 | 0.23 | 0.02 | <.5 |
| Al$_2$O$_3$ | 4.7 | 2.2 | 3.0 | 3.0 |
| SiO$_2$ | 96.9 | 95.3 | 94.8 | 95.9 |
| X-ray type | ZSM-5 | ZSM-5 | ZSM-5 | ZSM-8 |

EXAMPLE 5

A first column 120 inches long and 0.75 inches in diameter was provided with Zonyl E-7 on Chromosorb P and maintained at 140° C. A second column 6 inches long and 0.50 inches in diameter was packed with ZSM-5 zeolite in the hydrogen form as prepared in Example I. The feed was 1.5 ml. of a reformate of the following composition:

| Ethylbenzene | 10 weight percent |
| Para-xylene | 25 weight percent |
| Meta-xylene | 45 weight percent |
| Ortho-xylene | 20 weight percent |

This mixture was pumped to the top of the first column at a pumping speed of 20 ml./hr. and there admixed with steam, pumped at a rate of 25 ml./hr., in a vaporizer. The mixture was then passed through the Zonyl E-7 containing column. Fractions were eluted from the column using a helium flow and water as a stripping agent. After 5–6 minutes the first fraction was recovered which was 0.15 ml. of ethyl benzene having a purity of >99 percent. Thereafter, in the period of 6–7 minutes, a mixture of 1.05 ml. of meta-xylene and para-xylene were eluted from the column and passed to the zeolite column.

In the period of 8–9 minutes, there was eluted 0.30 ml. of ortho-xylene which analysis showed had a purity of >99 percent.

The 1.05 ml. mixture of para- and meta-xylenes was then passed to the top of the second column for contact with the zeolite. Vapor mixtures of xylenes and steam eluting from the second column were condensed and each hydrocarbon recovered following liquid phase separation. From this column, in the period of 2 minutes after entering the second column, 0.67 ml. of meta-xylene was eluted which analyzed as 99 percent pure and in the period of 4 minutes, 0.375 ml. of 99 percent pure para-xylene was eluted. Recovery was essentially 100 percent.

The general description of the invention and the specific working examples illustrate the process as being carried out utilizing two separate columns, one containing the partitioning agent and the other the zeolite. Quite obviously, however, the separation procedure of the invention could also be effected in a single stage column or chromatographic process which could contain combinations of the separation media. Thus in this embodiment, a single column would be utilized with the column containing the partitioning agent as the first separation medium and the zeolite as the second separation medium.

The invention has been described herein with reference to certain preferred embodiments. However, it is not to be considered as limited thereto as obvious variations thereon will become apparent to those skilled in the art.

What is claimed is:

1. A process for the separation of a mixture containing ethylbenzene, ortho-xylene, meta-xylene and para-xylene into its component parts which comprises contacting the mixture with a liquid phase partitioning agent, separating the ethylbenzene, a mixture of para-xylene and meta-xylene and ortho-xylene in that order, passing the mixture of para-xylene and meta-xylene in contact with a crystalline zeolitic material having the X-ray diffraction pattern set forth in Table I whereby each component is sorbed at a different rate, separating the meta-xylene followed by separating the para-xylene in that order as each component leaves contact with the zeolite.

2. A process according to claim 1 wherein the zeolite is ZSM-5.

3. A process according to claim 1 wherein the zeolite is ZSM-8.

4. A process according to claim 1 wherein said partitioning liquid phase is selected from from the group consisting of Zonyl E-7 on Chromosorb P, diethylene glycol succinate, polyethylene glycol, tetracyano ethylated pentaerythritol, and 1,2,3 tris (2-cyanoethoxy) propane.

5. A process according to claim 4 wherein the zeolite and partitioning liquid are maintained in columns through which the mixture is passed.

6. A process according to claim 5 wherein the column containing the partitioning liquid has a diameter about thirty times greater than the zeolite column.

7. A process according to claim 6 wherein a carrier is admixed with the mixture prior to passage through the columns.

8. A process according to claim 7 wherein the carrier is selected from the group consisting of steam, water, nitrogen, air, helium, hydrogen, hydrocarbons and mixtures thereof.

9. A process according to claim 8 wherein the temperature maintained in the column is about 25° to 300° C.

10. A process according to claim 9 wherein the sorbed materials are recovered by desorbing.

11. A process according to claim 10 wherein the mixture contains about 5–15 weight percent ethylbenzene, 20–30 weight percent para-xylene, 40–50 weight percent mata-xylene and 15–25 weight percent ortho-xylene.

12. A process according to claim 11 wherein the zeolite is selected from the group consisting of ZSM-5 and ZSM-8 and the partitioning liquid is Zonyl E-7 on Chromosorb P.

* * * * *

UNITED STATES PATENT OFFICE
CERTIFICATE OF CORRECTION

Patent No. 3,653,184        Dated April 4, 1972

Inventor(s) B.M. Drinkard, Paul T. Allen and Edward H. Unger

It is certified that error appears in the above-identified patent and that said Letters Patent are hereby corrected as shown below:

Column 1, line 1, "C" should be --$C_8$--.

Column 3, line 37, "1-15 (LTI)" should be --0-15 (LTI)--.

Column 6, line 10 of Table 2, under heading NaCl "2.26" should be --3.26--.

Signed and sealed this 5th day of September 1972.

(SEAL)
Attest:

EDWARD M. FLETCHER, JR.
Attesting Officer

ROBERT GOTTSCHALK
Commissioner of Patents